UNITED STATES PATENT OFFICE

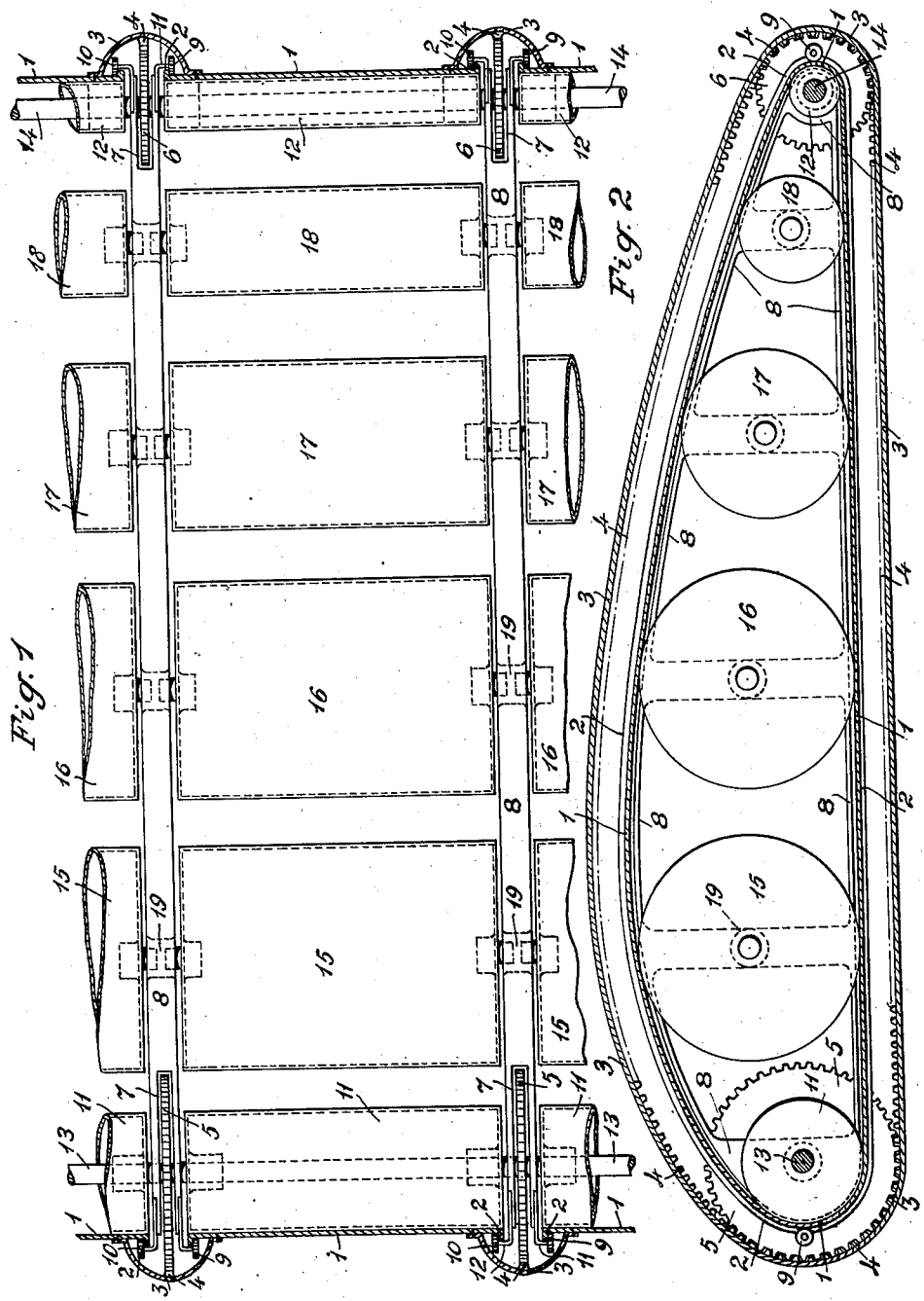

FILIBERTO DE LA TOUR CASTELCICALA, OF ROME, ITALY

ROLLING APRON FOR AIRPLANE WINGS

Application filed August 2, 1929, Serial No. 383,084, and in Italy August 3, 1928.

This invention relates to a construction having particular utility in connection with the wings of an airplane for varying the pressure of air on said wings.

It has been previously proposed to provide airplane wings with moving elements in order to obtain an unbalanced pressure on the wings similar to the well known "Magnus effect" and thereby enhance the tendency for the plane to remain aloft.

I have now devised a construction in the form of a moving apron having substantially the same outline as the wings, which may be applied to the entire wing surface of an aircraft or to predetermined parts thereof and which facilitate the suspension and flight of the plane to a materially greater extent than hitherto known structures.

It is accordingly an object of this invention to provide a device for application to the wing structure of an aircraft for minimizing the landing and starting velocities of the craft.

It is a further important object to provide a device for facilitating the flow of air currents about the wing surface to materially increase the difference in air pressures acting on the two surfaces to thus enhance the tendency for the plane to remain suspended.

It is a further important object to provide the wings of an aircraft with an apron moving relative to the surface of the wings to decrease the air resistance on the wings at certain angles and thus obtain a thrust, aiding in the propulsion of the plane.

Other and further important objects will become apparent from the following description and appended claims.

I have illustrated by way of example my invention by the annexed drawings in which Fig. 1 shows a partial plan view of a wing according to invention, and Fig. 2 a partially sectioned elevation.

On the drawings,

The moving apron comprises a plurality of laterally spaced endless elements 1 having their side edges bent at right angles to form the flanges 2. Each of said elements 1 is trained around and supported upon a plurality of rollers 11, 12, 15, 16, 17 and 18, of a length equal to the width of each element 1, and diameters varying in size, according to the position of each roller on the wing, to thereby cause said endless member to form the contour of the wing surface. The elements are united together by bands 3 suitably bolted to said elements 1. The said bands are ogival shaped in order to favor the engulfing of air. In the inner side of the vertex of said bands are fixed racks or pivoted ring chains 4 adapted to engage with pinions 5 and 6 keyed in slots 7 provided in the ends of framework 8.

In order to prevent the apron elements 1 from assuming the form of catenaries or rising by centrifugal action during rotation the flanges 2 are guided by wheels 9 and 10 rotatably mounted on supports 11 and 12 arranged laterally of framework 8 thus retaining the sides of said elements in place.

As said above the rollers follow the outline of the wings and therefore have different diameter which little exceed the heights of the framework in order to avoid friction on their surfaces. Rollers 11 and 12, the former constituting the fore edge, and the latter the aft edge of wing are rigid with their axles 13 and 14. The pinions 5 and 6 which cooperate with racks 4 to effect the rotation of the apron are secured to said axles, which extend the entire length of the wing or the wing surface covered by the members 1. Said rollers 11 and 12 thus constitute the drive rollers for the apron while the intermediate rollers 15, 16, 17 and 18 are merely idlers which are driven by said apron.

The intermediate rollers 15, 16, 17 and 18 are loosely mounted and rotate with the axles journaled in recesses 19 provided in ribs of the framework. The rotation of the driving axles 13 and 14 is transmitted by known means (not shown) from the motor of the apparatus to an auxiliary motor.

Having now particularly described my said invention, and in what manner the same is to be performed I declare that what I claim is:

1. A device for producing an unbalanced pressure on the wings of an aircraft comprising a plurality of rotatable supporting elements secured to said wings and having perimeters of varying sizes, a plurality of endless members trained about said supporting elements so as to assume the contour of said wings, means rigidly connecting the sides of said endless members and means housed by said first named means cooperating with other means fixed to certain of said supporting elements for driving said endless members.

2. A device for producing an unbalanced pressure on the wings of an aircraft comprising a plurality of rollers of varying diameters secured to the wings, a plurality of endless members trained around said rollers, said rollers being so arranged that said endless members assume substantially the contour of said wings, curved bands rigidly connecting the sides of said endless members and projecting above the surfaces thereof, means housed by and secured to said endless bands and other means secured to certain of said rollers cooperating with said first named means to drive said endless members.

3. A device for producing an unbalanced pressure on the wings of an aircraft comprising a plurality of rollers of varying diameters secured to said wings, a plurality of endless members trained around said rollers, said rollers being so arranged that said endless members assume substantially the contour of said wings, curved bands rigidly connecting the sides of said endless members and projecting above said members a rack housed by and secured to each of said endless bands and pinions secured to certain of said rollers cooperating with said racks to drive said endless members.

4. A device for producing an unbalanced pressure on the wings of an aircraft comprising a plurality of rollers of varying diameters secured to said wings, a plurality of endless members trained around said rollers, said rollers being so arranged that said endless members assume substantially the contour of said wings, the end rollers of said arrangement being power-driven, curved bands rigidly connecting the sides of said endless members and projecting above the surfaces thereof, racks housed by and secured to said endless bands, pinions connected to said end rollers meshing with said racks to drive said endless members and means for retaining said endless members in position on said rollers.

5. A device as in claim 4, wherein the means for retaining said endless members in position comprise flanges on the lateral edges of said endless members and wheels mounted on said end rollers cooperating with said flanges.

In witness whereof I have hereunto set my signature.

FILIBERTO de la TOUR CASTELCICALA.